US009251256B2

(12) United States Patent
Belaunde

(10) Patent No.: US 9,251,256 B2
(45) Date of Patent: Feb. 2, 2016

(54) SYSTEM AND METHOD FOR MAINTAINING CUE POINT DATA STRUCTURE INDEPENDENT OF RECORDED TIME-VARYING CONTENT

(75) Inventor: Iván Cavero Belaunde, San Francisco, CA (US)

(73) Assignee: Adobe Systems Incorporated, San Jose, CA (US)

(*) Notice: Subject to any disclaimer, the term of this patent is extended or adjusted under 35 U.S.C. 154(b) by 1432 days.

(21) Appl. No.: 11/951,884

(22) Filed: Dec. 6, 2007

(65) Prior Publication Data

US 2014/0304233 A1 Oct. 9, 2014

(51) Int. Cl.
*G06F 17/30* (2006.01)
(52) U.S. Cl.
CPC ................................ *G06F 17/30781* (2013.01)
(58) Field of Classification Search
CPC ............ G06F 17/30073; G06F 17/30011; G06F 17/30067; G06F 17/30091; G06F 17/30312
USPC ................... 707/1, 661; 386/52, 95; 715/716; 725/20; 709/203
See application file for complete search history.

(56) References Cited

U.S. PATENT DOCUMENTS

| 6,628,889 | B2* | 9/2003 | Inoue | 386/52 |
| 6,757,573 | B1* | 6/2004 | Ledoux | G06F 3/16 381/61 |
| 7,590,329 | B2* | 9/2009 | Shinkai et al. | 386/52 |
| 2002/0152270 | A1* | 10/2002 | McManus et al. | 709/203 |
| 2003/0219223 | A1* | 11/2003 | Shinkai et al. | 386/52 |
| 2007/0038931 | A1* | 2/2007 | Allaire et al. | 715/526 |
| 2007/0263984 | A1* | 11/2007 | Sterner et al. | 386/95 |
| 2007/0294622 | A1* | 12/2007 | Sterner et al. | 715/716 |
| 2008/0163283 | A1* | 7/2008 | Tan et al. | 725/20 |

OTHER PUBLICATIONS www.clearplay.com Mar. 11, 2008, pp. 1.
www.clearplay.com/About.aspx, Mar. 11, 2008, pp. 1-2.
http://clearplay.custhelp.com/cgi-bin/clearplay.cfg/php/enduser/std_adp.php?p_faqid=678tp_created=10 . . . Mar. 11, 2008, pp. 1-3.
http://clearplay.custhelp.com/cgi-bin/clearplay.cfg/php/enduser/std_adp.php?p_faqid=145&p_created=1 . . . Mar. 11, 2008, pp. 1-4.

* cited by examiner

*Primary Examiner* — Sheree Brown
(74) *Attorney, Agent, or Firm* — Kilpatrick Townsend & Stockton LLP

(57) ABSTRACT

A cue point data structure is maintained independent of a recorded time-varying content file. Embodiments of the present invention enable cue point data structures to be defined and then saved and independently recalled for application to any recorded time-varying content file. An authoring tool includes an interface to enable an author to, once having defined one or more cue points for a first recorded time-varying content file, save data structure(s) defining such one or more cue points independent of the first recorded time-varying content file. The authoring tool may further include an interface that enables an author to recall previously-saved cue point data structures. In this manner, the author may save and reuse cue point data structures. Further, a plurality of cue points may be saved together as a cue point scenario. Additionally, the data structure may be in a non-proprietary format, such as an extensible mark-up language (XML) format.

32 Claims, 14 Drawing Sheets

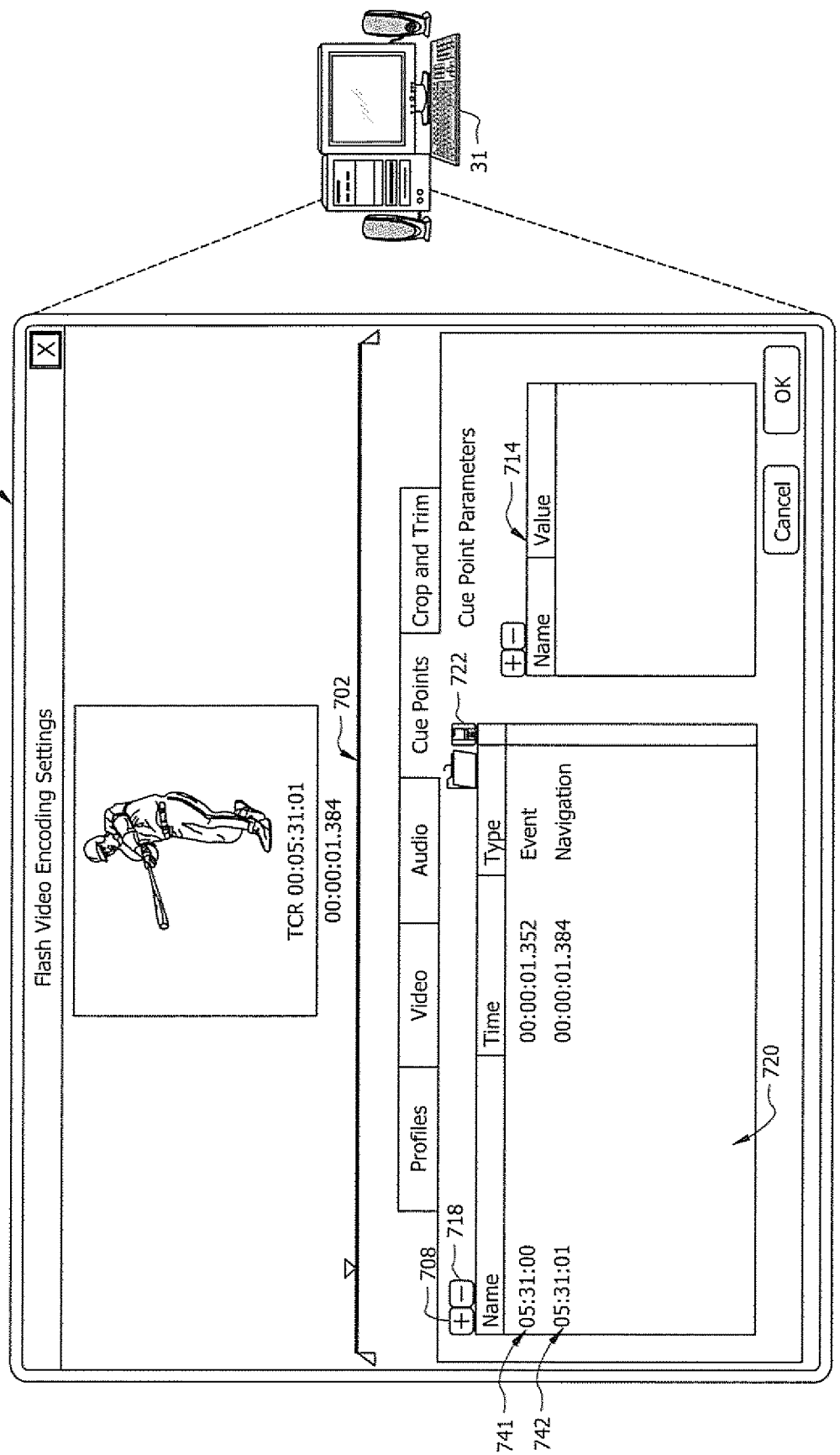

SYSTEM AND METHOD FOR MAINTAINING CUE POINT DATA STRUCTURE INDEPENDENT OF RECORDED TIME-VARYING CONTENT

TECHNICAL FIELD

The following description relates generally to cue points within recorded time-varying content, such as video and/or audio content, and more specifically to systems and methods for maintaining such a cue point data structure independent, of the recorded time-varying content, which may thus permit reuse of a cue point data structure.

BACKGROUND

Recorded time-varying content is an ever-increasingly popular form of content. Various types of recorded time-varying content are known, including as examples video (e.g., movies, films, etc., which may comprise audiovisual content), audio (e.g., music, songs, audio-books, etc.), animation (e.g., cartoons, video games, etc.), multimedia content, and other forms of recorded content whose output vary over time. During the playback of such recorded time-varying content, the output changes (e.g., the images being displayed in a video change during the playing of the video, the audio output during playing of a song changes over the course of the song, etc). Thus, recorded time-varying content, as used herein, generally refers to any type of content (e.g., video, audio, etc.) whose output varies over the time of the recording.

Such recorded time-varying content is often stored in electronic form (e.g., as an electronic file) to a computer-readable data storage medium, such as a hard disk, magnetic data storage, optical data storage, memory, etc., and may be accessed by a playback application (referred to as a player) to output (or "playback") the recorded time-varying content (e.g., output the video, audio, etc.). As an example, the content of recorded time-varying content files may be presented to users via a media player application executing on a processor-based device, such as a personal computer (PC), laptop computer, mobile telephone, portable media player devices (e.g., iPod, etc.). Various media player applications are well known for reading recorded time-varying content files (e.g., multimedia files) and presenting their content to a user, including as examples ADOBE SYSTEMS INCORPORATED'S FLASH PLAYER™ (e.g., ADOBE® FLASH PLAYER 9), MICROSOFT WINDOWS MEDIA PLAYER™ developed by Microsoft Corporation, QUICKTIME™ developed by Apple computer, and REAL PLAYER™ developed by Real Networks. Also, various file formats have been developed for recorded time-varying content (such as multimedia file formats), including as examples such well-known video compression formats as MPEG (Moving Picture Experts Group, including MPEG-1, MPEG-2, and/or MPEG-4, as examples), H.261. H.262, H.263, H.264, AVS, Bink, Dirac, Indeo, MJPEG, Real Network's RealVideo format, Theora, VC-1, VP6, VP7, WMV (Windows Media Video), and QUICKTIME'S MOV format; and including as examples such well-known audio compression formats as MPEG-1 Layer 3 (MP3), MPEG-1 Layer 2, AAC, HE-AAC, G.711, G.722, G.722.1, G.722.2, G.723, G.723.1, G.726, G.728, G.729, G.729.1, G.729a, AC3, Apple Lossless, ATRAC, FLAC, iLBC, Monkey's Audio, μ-law, Musepack, Nellymoser, Real Network's RealAudio format, SHN, Speex, Vorbis, Way Pack, WMA, and TAK. Further, in some instances, a recorded time-varying content file may be implemented using a media container format such as one of the well-known media container formats of 3GP, ASF, AVI (Audio Video Interleave), DMF, DPX, FLV, Matroska, MP4, MXF, NUT, Ogg, Ogg Media, QuickTime, RealMedia, VOB, AIFF, AU, and WAV.

Various authoring tools are known for use in aiding an author in creating, editing, and/or otherwise authoring recorded time-varying content. Such authoring tools typically comprise a computer-executable software program that comprises computer-executable instructions (or code) stored to a computer-readable medium, which when executed by a processor-based device ("computer") causes the computer to perform operations described herein for such authoring tools. For instance, the authoring tools often present a user interface to a display with which a user (e.g., "an author") can interact to author (e.g., create, edit, etc.) a recorded time-varying content file. Examples of such authoring tools known in the art include ADOBE FLASH™, ADOBE FLASH MEDIA ENCODER, ADOBE AFTER EFFECTS™, ADOBE AUDITION™, ADOBE PHOTOSHOP™, ADOBE PREMIERE™, ADOBE VISUAL COMMUNICATOR™, and MACROMEDIA DIRECTOR® MX 2004.

Certain authoring tools may aid an author in editing the actual content of a recorded time-varying content file, such as by cutting out portions of the content (e.g., removing frames of a video), rearranging frames in the content, generating portions of the content (e.g., recording video and/or audio, performing computer-generated animation, etc), and/or performing other editing of the content. In addition, certain authoring tools may aid an author in editing certain characteristics of the recorded time-varying content file, such as the file format in which the content is stored, the resolution of the content, the bit rate for encoding and/or playback of the content, the codec used for encoding the content to a particular type of recorded time-varying content file, etc. Other types of authoring operations may be supported by various authoring tools, as are well known in the art.

One popular type of authoring operation that many authoring tools support is the insertion of cue points into a recorded time-varying content file. In general, a cue point is a defined point or marker that can be employed to trigger some event, such as an event that may be external to the recorded time-varying content. Thus, cue points provide invisible markers within a recorded time-varying content file which may be used to trigger such events as synchronization (e.g., synchronizing graphics, subtitles, etc., relative to particular points within the recorded time-varying content), providing navigation options (e.g., marking designated "chapters" or other sections within the recorded time-varying content to enable easy jumping to those marked chapters or sections), and/or loading other content (e.g., loading other video files, etc). As one example, an author may insert a cue point at a point within a video file to trigger subtitle text to be presented to a display at that point of playback of the video. As another example, when authoring video for a television program, an author may insert a cue point within such video file to designate when the video is to break to commercial (e.g., to trigger loading of another video file that presents the commercial content). Thus, authoring tools allow an author to insert a cue point at any point along a recorded time-varying content's reference playback timeline and/or at any given frame of the recorded time-varying content.

As an example, video cue points are supported in ADOBE's FLASH Professional 8, where an author can use cue points in conjunction with the FLASH FLVPlayback component to coordinate the playback of a video clip with accompanying interactive content. For instance, an author can use FLASH Professional 8 to create a FLASH presentation that has video playing in one area of the screen, wherein the author can insert cue points within the video to tigger other actions such as presentation of descriptive text and/or graphics in other areas of the screen at designated points during the playback of the video. Thus, such use of cue points enables the author to create richer and/or more interactive content.

Cue points can be inserted directly into a FLASH Video (FLV) file, for example, using either the FLASH Video Encoder or the Video Import Wizard of FLASH Professional 8. An author can also add and remove cue points with Action-Script using the addCuePoint and removeCuePoint methods.

Cue points are implemented as some type of data structure that defines the cue point properties. For instance, generally each cue point has a name and time value that designates the respective point in time within the recorded time-varying, content (e.g., video) file at which the cue point occurs. The cue point reference time may be specified in hour:minute: second:millisecond format. In some instances, the cue point reference time may be designated based on a corresponding frame of the recorded time-varying content, rather than or in addition to the reference time at which such frame occurs within the recorded time-varying content. For instance, an author may, in some instances view a video frame-by-frame, and insert a cue point at the occurrence of a specific frame.

The cue point data structure may further comprise data indicating a corresponding "type" of the cue point. As discussed further herein, different types of cue points may be defined, such as navigation cue points, event cue points and ActionScript cue points.

Further, a cue point data structure may comprise parameter data that specifies an action to be triggered upon the cue point being encountered. As examples, the parameter data may specify the subtitle text that is to be presented upon the corresponding cue point being encountered, or the parameter data may specify the name of another file (e.g., another video or audio file) to be launched upon the corresponding cue point being encountered.

FIGS. 1A-1B show an exemplary system 10 of the prior art in which a user interface of an authoring application 12 is provided to enable a user to insert a cue point into a video. As shown in FIG. 1A, system 10 comprises a processor-based computer 11, such as a personal computer (PC), laptop computer, server computer, workstation computer, etc. In this example, an authoring tool (or "application") 12 is executing on such a computer 11 with which a user may interact to author recorded time-varying content, such as the exemplary video being output to a preview display 101. Authoring tool 12 comprises computer-executable software code stored to a computer-readable medium that is readable by a processor of computer 11 and, when executed by such processor, causes computer 11 to perform the various operations described further herein for such authoring tool 12. Examples of such, an authoring tool 12 known in the art include the ADOBE FLASH™, ADOBE FLASH MEDIA ENCODER, ADOBE AFTER EFFECTS™, ADOBE AUDITION™, ADOBE PHOTOSHOP™, ADOBE PREMIERE™, ADOBE VISUAL COMMUNICATOR™, and MACROMEDIA DIRECTOR® MX 2004 authoring applications. The exemplary interface shown as being provided by authoring tool 12 in FIGS. 1A-1B corresponds to that provided by the Flash Video Import Wizard in FLASH Professional 8, with which an author may interact to define cue points for a video as described further hereafter.

In me example of FIGS. 1A-1B, an author interacts with authoring tool 12 to perform authoring operations for a video, such as those operations mentioned above. In particular, in this illustrative example the author interacts with authoring tool 12 to insert a cue point in the video. The exemplary interface of authoring tool 12 provides a content preview display 101 which allows the author to view portions of the content. For instance, the author can "scrub" (or move) along the video's reference timeline 102 to view corresponding parts of the video content. The user may view the video frame-by-frame, in slow-motion playback, etc.

Additionally, certain characteristics of the video file may be defined by the author, such as by defining via input box 106 the quality (e.g., video data rate), video codec, audio codec, audio data rate, etc. Thus, these characteristics of the video file may be modified in addition to or instead of modifying the actual content (e.g., frames) of the video.

A cue point insertion interface 107 is also provided. In FLASH Professional 8, such cue point insertion interface 107 may be accessed by clicking the "Show Advanced Settings" from the Encoding panel of the Video Import Wizard. The author can then select the cue points tab to be presented the cue points interface 107, as shown. On the reference timeline 102, a playback, head indicator 105 is shown, which may be used to locate a specific frame in the video in which the author wants to embed a cue point. For greater precision, the author may select the playback head 105 and use the left and right arrow keys on a keyboard to locate specific points within the video's content. Thus, the video preview window 101 enables an author to visually identify points in the video at which to insert a cue point. The author can also use the elapsed time counter (as indicated by elapsed time indicators 103 and 104 that are located beneath the video preview window 101) to locate specific points in time at which to embed cue points.

When the playback head 105 is positioned on the desired frame, the author can activate (e.g., click with a mouse) the Add Cue Point button 108. FLASH then embeds a cue point on that frame of the video. As shown in FIG. 1B, responsive to the user activating the add cue point button 108, a new cue point 110 is identified in the cue point list 120. The new cue point 110 is defined by certain data, such as a name 111 (e.g., "New Cue Point" in this example), time 112 (e.g., 00:00: 17.796 in this example), and type 113 (e.g., an event or navigation type of cue point).

Time 112 identifies the time during playback of the video (e.g., the time on the videos reference timeline 102) when the corresponding event will be triggered by the cue point 110. The types 113 of the cue point may be event or navigation, as examples. Event cue points may be used to trigger Action-Script methods when the cue point is reached. Event cue points enable the author to synchronize the video playback to other events within the FLASH presentation. Navigation cue points may be used for navigation and seeking, and can also trigger ActionScript methods when the cue point is reached. Embedding a navigation cue point may insert a keyframe at that point in the video clip.

In this example, a cue point marker 109 is displayed on the slider control (of reference timeline 102) at the point where the cue point 110 was embedded. The author can use the cue point marker 109 to adjust the placement of the cue point. That is, the author may adjust the placement of the cue point 110 within the video by dragging the corresponding cue point marker 109 to the desired point on timeline 102.

Additionally, the cue point data structure typically comprises parameter data that defines an action to be triggered. As examples, the parameter data may specify the subtitle text that is to be presented upon the corresponding cue point being encountered, or the parameter data may specify the name of another file (e.g., another video or audio file) to be launched upon the corresponding cue point being encountered. Thus, for cue point 110, the author may add one or more parameters into parameter interface 114 by activating insert parameter button 115. For any such parameter, the author may define a corresponding name (in name field 116) and value (in value field 117). For instance, a parameter named "End Subtitle" may be defined whose value specifies the text "The End" to be presented at a corresponding point near the end of the video at which cue point marker 109 may be placed. The parameters may be passed to the cue point event handler as members of the single parameter object.

Traditionally, the cue point data structure defining such information as the cue point's name, time, type, and parameters is embedded within an encoding of a recorded time-varying content file (e.g., video file) in a proprietary (e.g., binary) format. Because the cue point data structure is embedded in the encoded time-varying content file, reuse of a cue point data structure when authoring (e.g., editing) other time-varying content files has traditionally not been available. As a result, inefficiency arises in many instances because the author is required to re-define cue points for each recorded time-varying content file that is being authored on a case-by-case basis. Further, because the cue point data structure has traditionally been in a proprietary format, access to such cue point data structure (e.g., for editing it, etc.) has been limited to an authoring tool that is coded to recognize such proprietary format.

FIG. 2 shows a block diagram of an exemplary system 20 in which an authoring tool 12 may be used to embed a cue point at a desired point in a video, such as described above with FIGS. 1A-1B. In this example, suppose an author uses authoring tool 12 to edit a first recorded time-varying content file 22, including inserting cue points at one or more points in the recorded time-varying content file 22. The cue point data structure 201, including the cue point's name, time, type, and parameters 202, is embedded (in a proprietary format of authoring tool 12) within the encoded time-varying content file 22 that is created. Now, further suppose that the author uses authoring tool 12 to edit a second recorded time-varying content file 23, including inserting cue points at one or more points in the recorded, time-varying content file 23. The cue point data structure 203, including the cue point's name, time, type, and parameters 204, is embedded (in a proprietary format of authoring tool 12) within the encoded time-varying content file 23 that is created. The cue point data structures 201 that were previously defined for recorded time-varying content file 22 are not available for reuse in authoring recorded time-varying content file 23. For instance, when working with a given recorded time-varying content file, authoring tool 12 does not allow an author to recall previously-defined cue point data structures that may have been defined previously for a different recorded time-varying content file. Such lack of reusability leads to inefficiencies by author, as discussed further below.

Suppose, as an example, that an author uses authoring tool 12 to edit a first video 22, and the author interacts with authoring tool 12 in the manner discussed above with FIGS. 1A-1B to specify cue points at various points within the first video 22. Those cue points are defined by corresponding cue point data structures 201 that are embedded in the first video file 22. So, the user creates/edits video 22, inserts the cue points, and then encodes the video to a desired encoded file type, resulting, in encoded video 22. Once encoded, the cue point data structures 201 are not reusable in authoring other videos.

For example, suppose the author then desires a new version of the video. For instance, the first video file 22 may be too long, or its quality may be too poor, or it may be too big in size and/or uses up too much bandwidth to play back, etc. The author may create a new version of the video, such as video 23, to correct these problems. While the cue points 201 previously defined for the first video 22 may be again desired for the new video 23, such cue points are not reusable structures, and thus the author is required to again perform the actions discussed above with FIGS. 1A-1B to re-define the desired cue points for the new video 23, resulting in cue point data structures 203 that are embedded in such video 23.

As another example, in many cases recorded time-varying content is desired to follow a definite structure or format. For instance, television shows follow a designated structure in which they have an opening section, which is everything that plays before the opening credits, and there is typically a break to commercial right after the opening credits, then there will be a first segment of the show followed by another commercial break at some point (e.g., at approximately 15 minutes) into the show, followed by another segment of the show, etc. Thus, the cue points inserted for such a television show follow a similar pattern for each episode of the show, but may need to be adjusted slightly from one episode to the next (e.g., the exact cue point for breaking for commercial at the end of a first segment of the show may not be at an identical time point for every episode of a show). However, traditionally an author using authoring tool 12 is required to repeat the actions for defining/inserting the cue points for each episode of a show (e.g., for a first episode of a show 22, and a second episode of the show 23), as the cue points defined for a first episode are not reusable in authoring a second episode 23.

Accordingly, a desire exists for improved technique for managing cue point data structures.

SUMMARY

The present invention is directed to a system and method which maintain a cue point data structure independent of a recorded time-varying content file. For instance, embodiments of the present invention enable cue point data structures to be defined and then saved and independently recalled for application to any recorded time-varying content file. According to certain embodiments, an authoring tool includes an interface to enable an author to, once having defined one or more cue points for a first recorded time-varying content file, save data structure(s) defining such one or more cue points independent of the first recorded time-varying content file. The authoring tool may further include an interface that enables an author to recall previously-saved cue point data structures. In this manner, the author may save and reuse cue point data structure for authoring a plurality of different recorded time-varying content files. Accordingly, the efficiency of the author may be greatly enhanced, as the author is not required to re-define cue point data structures for each recorded time-varying content file being authored, as was required in the traditional authoring techniques discussed above.

Further, in certain embodiments of the present invention, a plurality of cue points may be saved together as a cue point scenario. As an example, an author may define cue points for various commercial breaks (and/or other actions) that are to occur at various points during playback of a first recorded television episode. Such defined cue points may be saved as a cue point scenario that is independently accessible (i.e., can be recalled without reference to the first recorded television episode). Thus, when authoring a second recorded television episode, the author may recall the saved cue point scenario and apply it to the second recorded television episode. Such application inserts into the second recorded television episode the cue points for commercial breaks (and/or other actions) at the specific times as defined for the first television episode. Of course, the author may further modify one or more of the inserted cue points for the second television episode (e.g., before encoding the second television episode). For instance, the specific times at which one or more of the commercial breaks is to occur for this second television episode may need to be adjusted slightly, etc. In this manner, the defined cue point scenario can effectively be recalled and used as a template or starting point for authoring similarly structured recorded time-varying content files (e.g., television episodes, etc.), which greatly enhances the efficiency of the author.

Further still, according to certain embodiments, the cue points are saved to a data structure in a non-proprietary format. For instance, in certain embodiments, the cue point data structure is in an extensible mark-up language (XML) format. Such non-proprietary format enables increased usage of the cue point data structure across a wide variety of different applications that are capable of reading the non-proprietary format.

According to one embodiment, an authoring tool receives information defining at least one cue point for a recorded time-varying content file. Such information may comprise various information defining the cue point, such as a name for the cue point, a corresponding time in the recorded time-varying content at which the cue point resides, a type of the cue point (e.g., event, navigation, etc.), as well as parameters defined for the cue point. The authoring tool forms a data structure containing the received information. The data structure is stored such that it is accessible independent of the recorded time-varying content file. In this way, the data structure is reusable for a plurality of different recorded time-varying content files. In some instances, a plurality of cue points may form a cue point scenario for a recorded time-varying content file, wherein the scenario is independently stored such that it is reusable for a plurality of different recorded time-varying content files. Also, in certain embodiments, the data structure for one or more cue points (e.g., for a cue point scenario) is in an open, non-proprietary format (e.g., XML) such that it can be accessed by a plurality of different applications.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIGS. 7A-7E show an exemplary user interface provided by an authoring tool according to one embodiment of the present invention, wherein the user interface is employed for inserting cue points into a video;

DETAILED DESCRIPTION

Figure 1A:
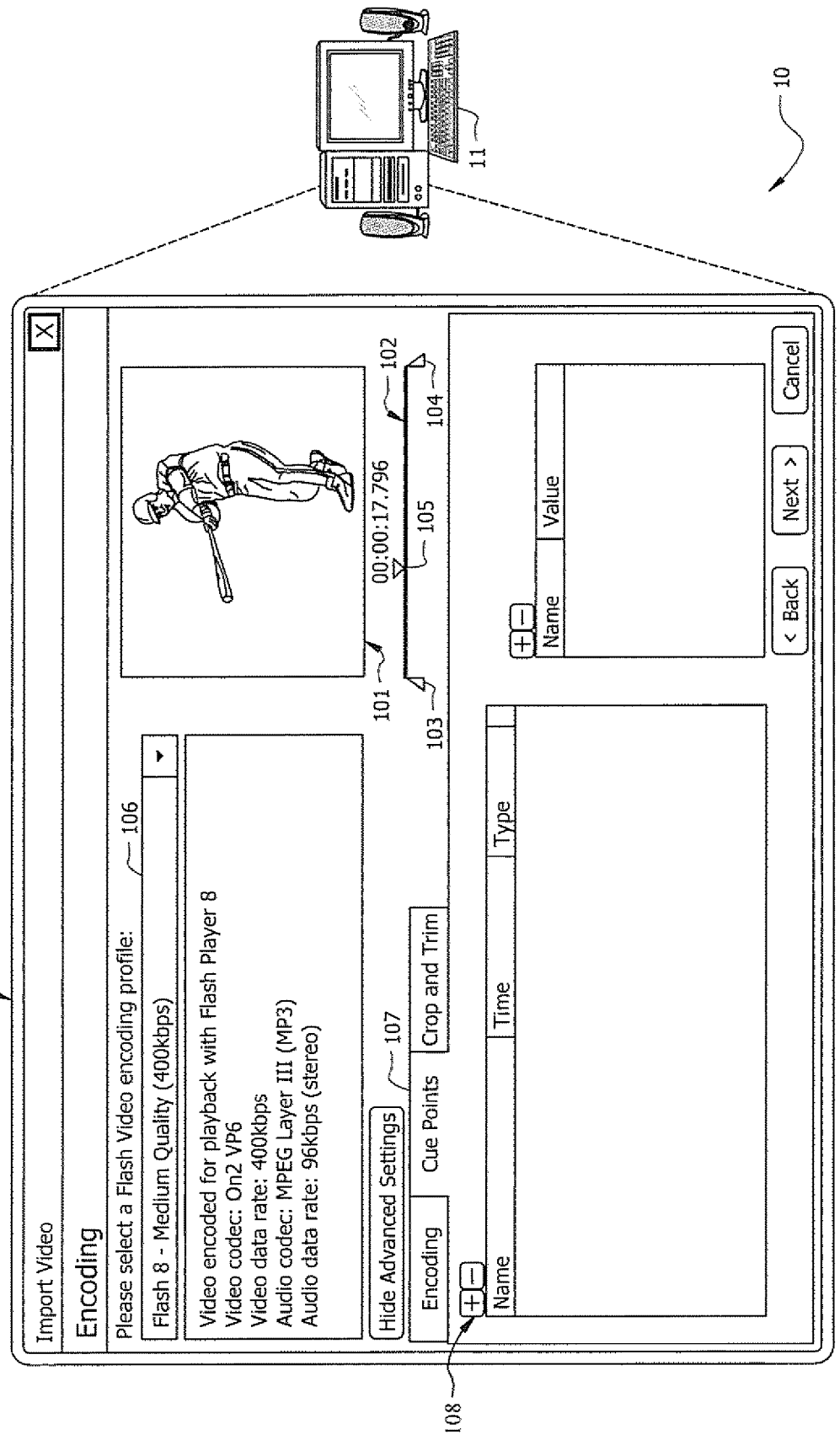
FIGS. 1A-1B show an exemplary system of the prior art in which a user interface of an authoring application is provided to enable a user to insert a cue point into a video.
Figure 1B:
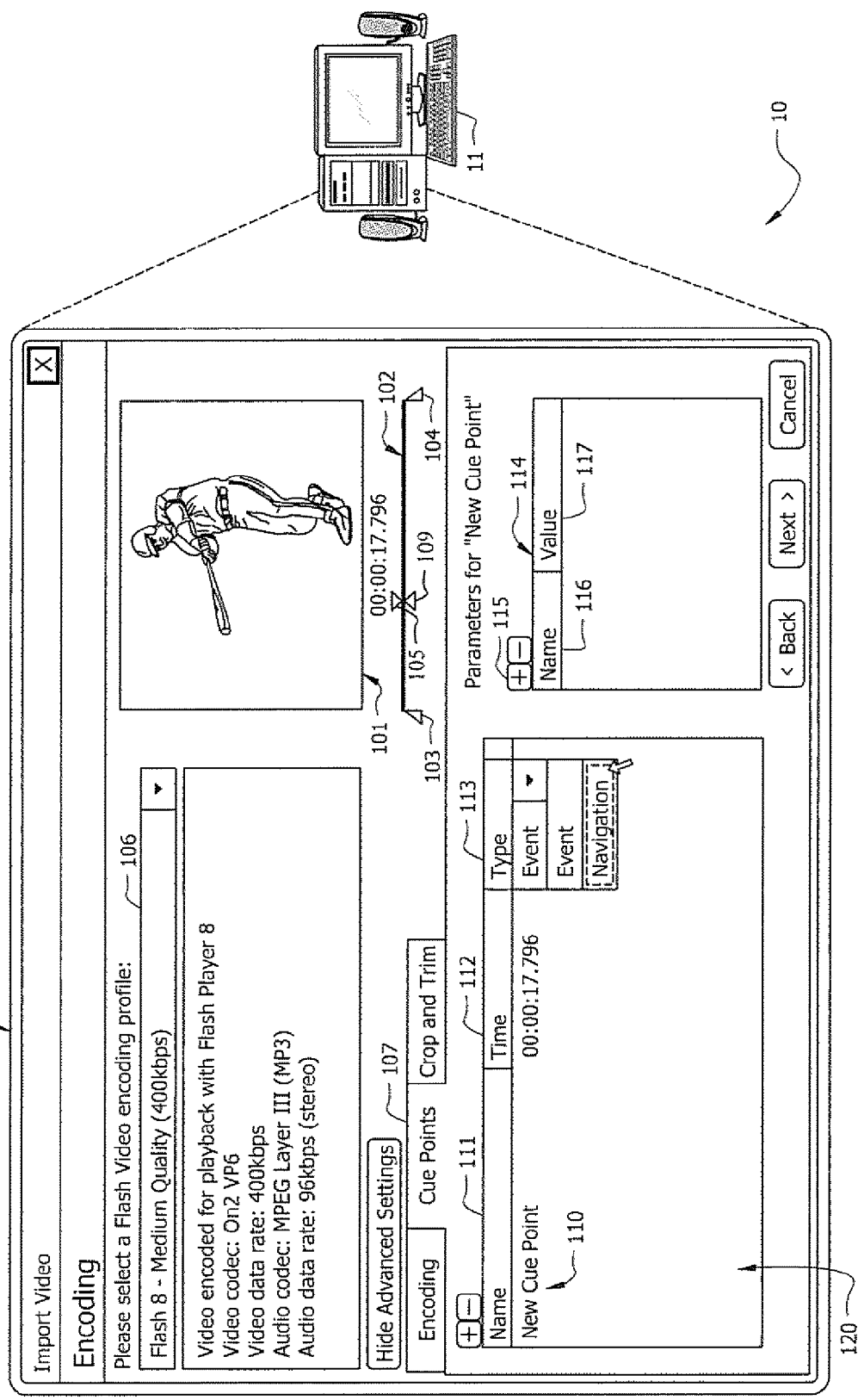
Figure 3:
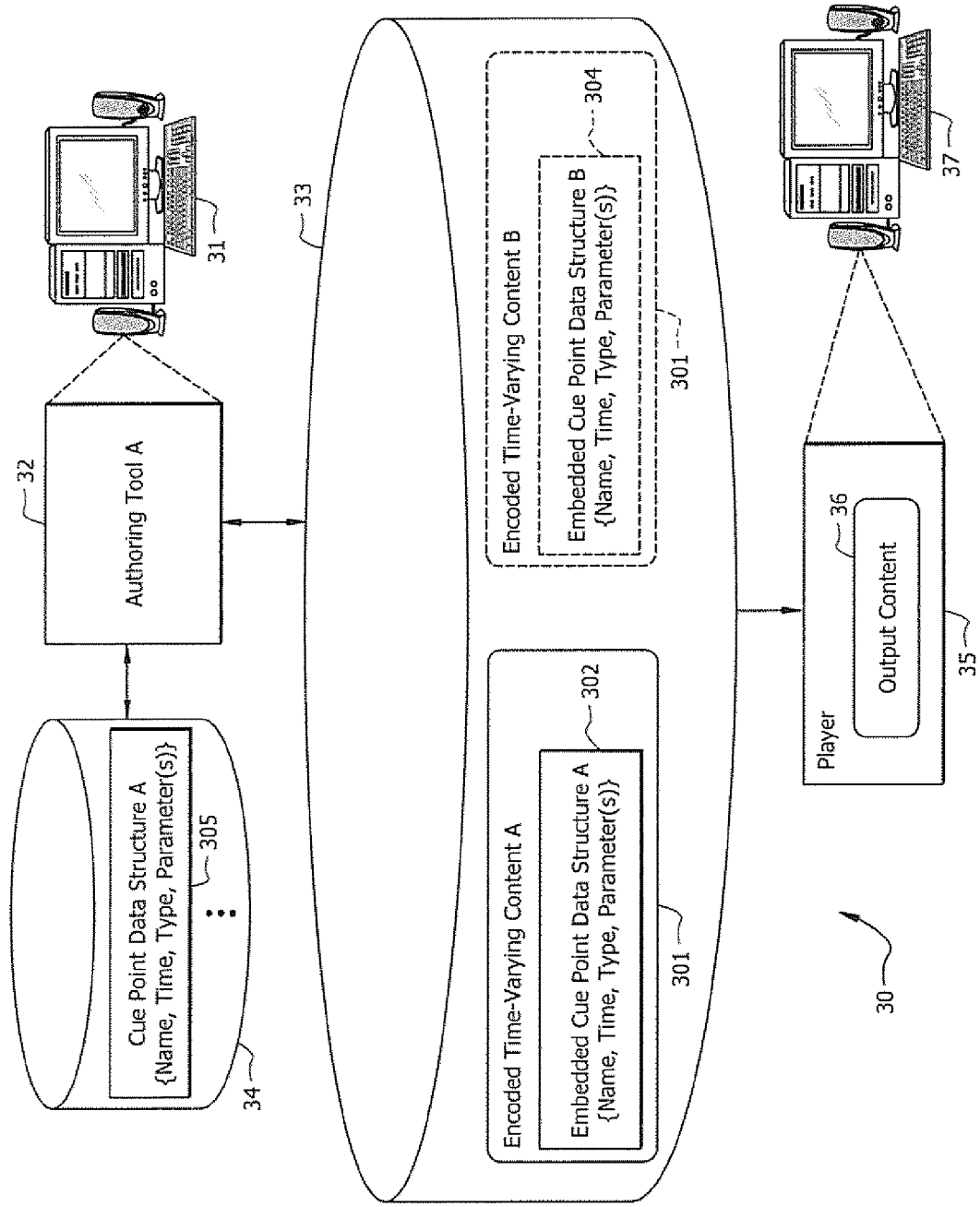
FIG. 3 shows an exemplary system illustrating aspects of one embodiment of the present invention.

Turning to FIG. 3, an exemplary system 30 illustrating aspects of one embodiment of the present invention is shown. As shown, system 30 comprises a processor-based computer 31, such as a personal computer (PC), laptop computer, server computer, workstation computer, etc. As in the example of FIGS. 1A-1B (in which an authoring tool 12 was executing on computer 11), an authoring tool 32 is executing on computer 31. While authoring tool 32 is shown as executing on computer 31 for ease of illustration in FIG. 3, it should be recognized that such authoring tool 32 may be residing and/or executing either locally on computer 31 or on a remote computer to which computer 31 is communicatively coupled via a communication network, such as a local area network (LAN), the Internet or other wide area network (WAN), etc.

As with, the exemplary authoring tool 12 described above with FIGS. 1A-1B, authoring tool (or "application") 32 comprises computer-executable software code stored to a computer-readable medium that is readable by a processor of computer 31 and, when executed by such processor, causes computer 31 to perform the various operations described further herein for such authoring tool 32. Examples of such an authoring tool 32 include ADOBE FLASH™, ADOBE FLASH MEDIA ENCODER, ADOBE AFTER EFFECTS™, ADOBE AUDITION™, ADOBE PHOTOSHOP™, ADOBE PREMIERE™, ADOBE VISUAL COMMUNICATOR™, and MACROMEDIA DIRECTOR® MX 2004, etc., which may be modified to include the functionality described herein for tool 32.

As with the traditional authoring tool 12 described above, authoring tool 32 provides a tool for aiding an author in creating, editing, and/or otherwise authoring recorded time-varying content. Such authoring tool 32 may present a user interface to a display with which a user (e.g., "an author") can interact to author (e.g., create, edit, etc.) a recorded time-varying content file. Authoring tool 32 may support any number of authoring operations. For instance, authoring tool 32 may aid an author in editing the actual content of a recorded, time-varying content file, such as by cutting out portions of the content (e.g., removing frames of a video), rear-ranging frames in the content, generating portions of the content (e.g., recording video and/or audio, performing computer-generated animation, etc.), and/or performing other editing of the content. In addition, authoring tool 32 may aid an author in editing certain characteristics of the recorded time-varying content file, such as the file format in which the content is stored, the resolution of the content, the bit rate for encoding and/or playback of the content, the codec used for encoding the content to a particular type of recorded time-varying content file, etc.

As with the exemplary authoring tool described above with FIGS. 1A-1B, authoring tool 32 enables the insertion of cue points into a recorded time-varying content file. For instance, an author may utilize authoring tool 32 to author (e.g., edit) recorded time-varying content (e.g., video, audio, etc.), wherein the author can utilize authoring tool 32 to insert one or more cue points at designated points in the recorded time-varying content. The resulting authored time-varying content can then be encoded (e.g., into a desired type of playback file that is readable by a playback application) to form an encoded recorded time-varying content file 301, which may have embedded therein a cue point data structure 302. Such authored file 301 can be stored to data storage (e.g., hard disk, optical storage, magnetic storage, memory, or other computer-readable data storage device) 33.

Figure 2:
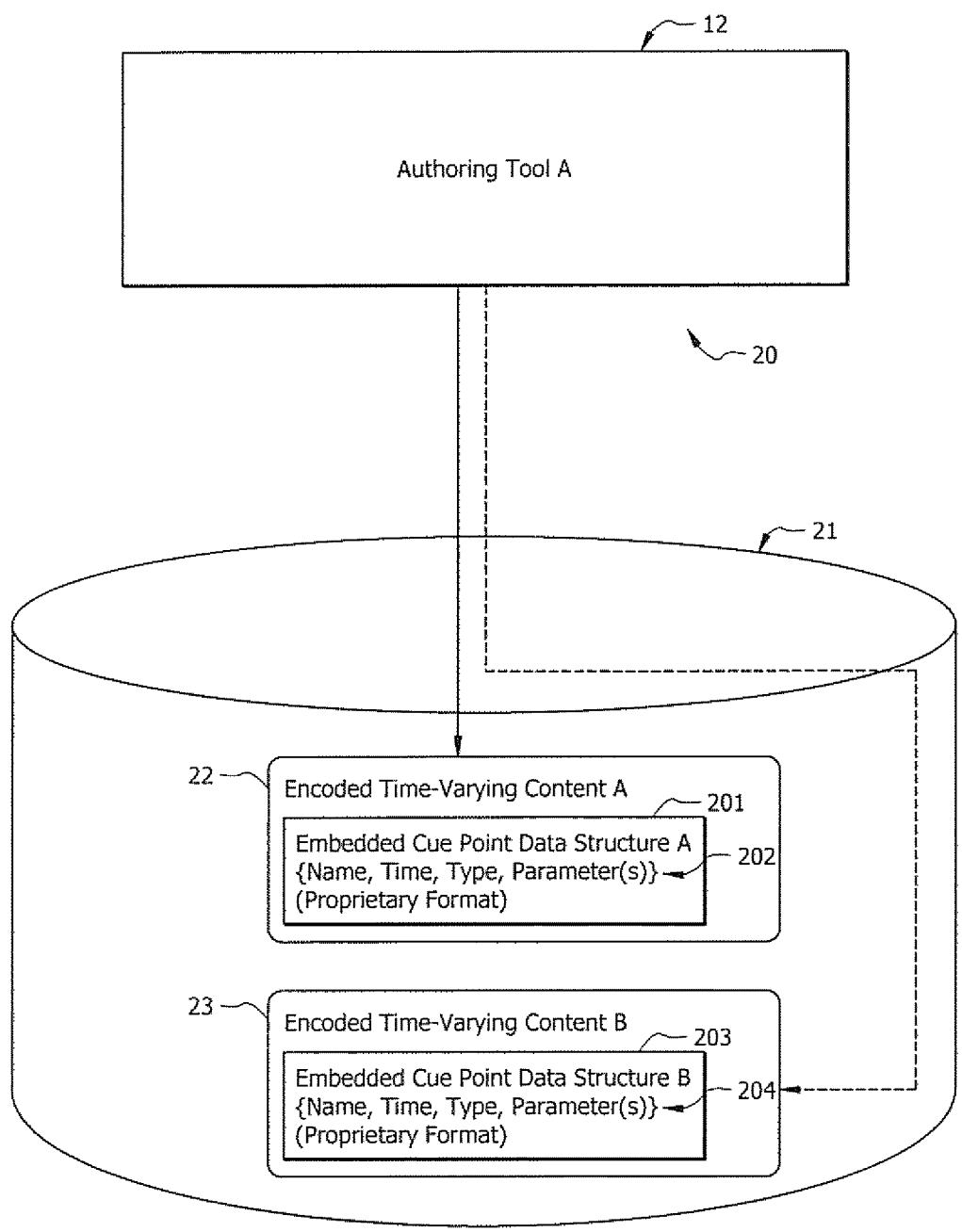
FIG. 2 shows a block diagram of an exemplary prior-art system in which an authoring tool may be used to embed a cue point at a desired point in a video in the manner described with FIGS. 1A-1B.

Thus, in certain embodiments, an encoded recorded time-varying content file 301 can be formed which has cue point data structure 302 embedded therein, as with encoded recorded time-varying content file 22 having cue point data structure 201 embedded therein in the above example of FIG. 2. However, according to embodiments of the present invention, a cue point data structure is also maintained independent of the recorded time-varying content file 301. For instance, the cue point data structure A defined for the recorded time-varying content file 301 may be stored to data storage (e.g., hard disk, optical storage, magnetic storage, memory, or other computer-readable data storage device) 34 as data structure 305. Such cue point data structure 305 is stored independent of the recorded time-varying content file 301. Thus, such cue point data structure 305 can be recalled or accessed independent of (i.e., without necessarily recalling or accessing) recorded time-varying content file 301. It should be noted that, while data storage devices 33 and 34 are shown for ease of illustration as separate elements, they may in implementation comprise a common data storage device or they may be implemented separately.

Thus, embodiments of the present invention enable cue point data structure(s) to be defined and then saved and independently recalled for application to any recorded time-varying content file. That is, cue point data structure 305 can be recalled by an author using authoring tool 32 (or some other application), and such cue point data structure 305 can be reused for defining cue points for another recorded time-varying content file. As an example, suppose an author later desires to author a different recorded time-varying content file 303; the author can recall cue point data structure 305 that was previously defined for recorded time-varying content file 301, and apply such cue point data structure 305 to the recorded time-varying content file 303, thereby inserting the corresponding cue point(s) defined by data structure 305 into recorded time-varying content file 303. The author may thereafter edit one or more of the cue points so inserted into the recorded time-varying content file 303. And, the author can then encode the recorded time-varying content file 303 to produce an encoded file that has cue point data structure 304 embedded therein.

Once authored and encoded, the resulting recorded time-varying content files 301 and/or 303 can be read by a playback application 35, which is operable to output 36 the recorded time-varying content. Player 35 comprises computer-executable software code stored to a computer-readable medium that is readable by a processor of computer 37 (which may the same computer as computer 31 or a different computer) and, when executed by such processor, causes computer 37 to perform the various operations described further herein for such player 35. Examples of such a player 35 include such well known playback applications for reading recorded time-varying content files (e.g., multimedia files) and presenting their content to a user as ADOBE SYSTEMS INCORPORATED'S FLASH PLAYER™ (e.g., ADOBE® FLASH PLAYER 9), MICROSOFT WINDOWS MEDIA PLAYER™ developed by Microsoft Corporation, QUICKTIME™ developed by Apple computer, and REAL PLAYER™ developed by Real Networks.

According to certain embodiments, an authoring tool 32 includes an interface to enable an author to, once having defined one or more cue points for a first recorded time-varying content file (e.g., file 301), save data structure(s) 305 defining such one or more cue points independent of the first recorded time-varying content file. The authoring tool 32 may further include an interface that enables an author to recall previously-saved cue point data structures 305. In this manner, the author may save and reuse cue point data structures 305 for authoring a plurality of different recorded time-varying content files (e.g., data structure 305 may be reused for authoring file 303). Accordingly, the efficiency of the author may be greatly enhanced, as the author is not required to re-define, from scratch, cue point data structures for each recorded time-varying content file 301 and 302 being authored, as was required in the traditional authoring techniques discussed above.

According to certain embodiments, the cue points are saved to a data structure 305 in an open, non-proprietary format. For instance, in certain embodiments, the cue point data structure 305 is in an extensible mark-up language (XML) format. Such non-proprietary format enables increased usage of the cue point, data structure across a wide variety of different applications that are capable of reading the non-proprietary format.

Figure 4:
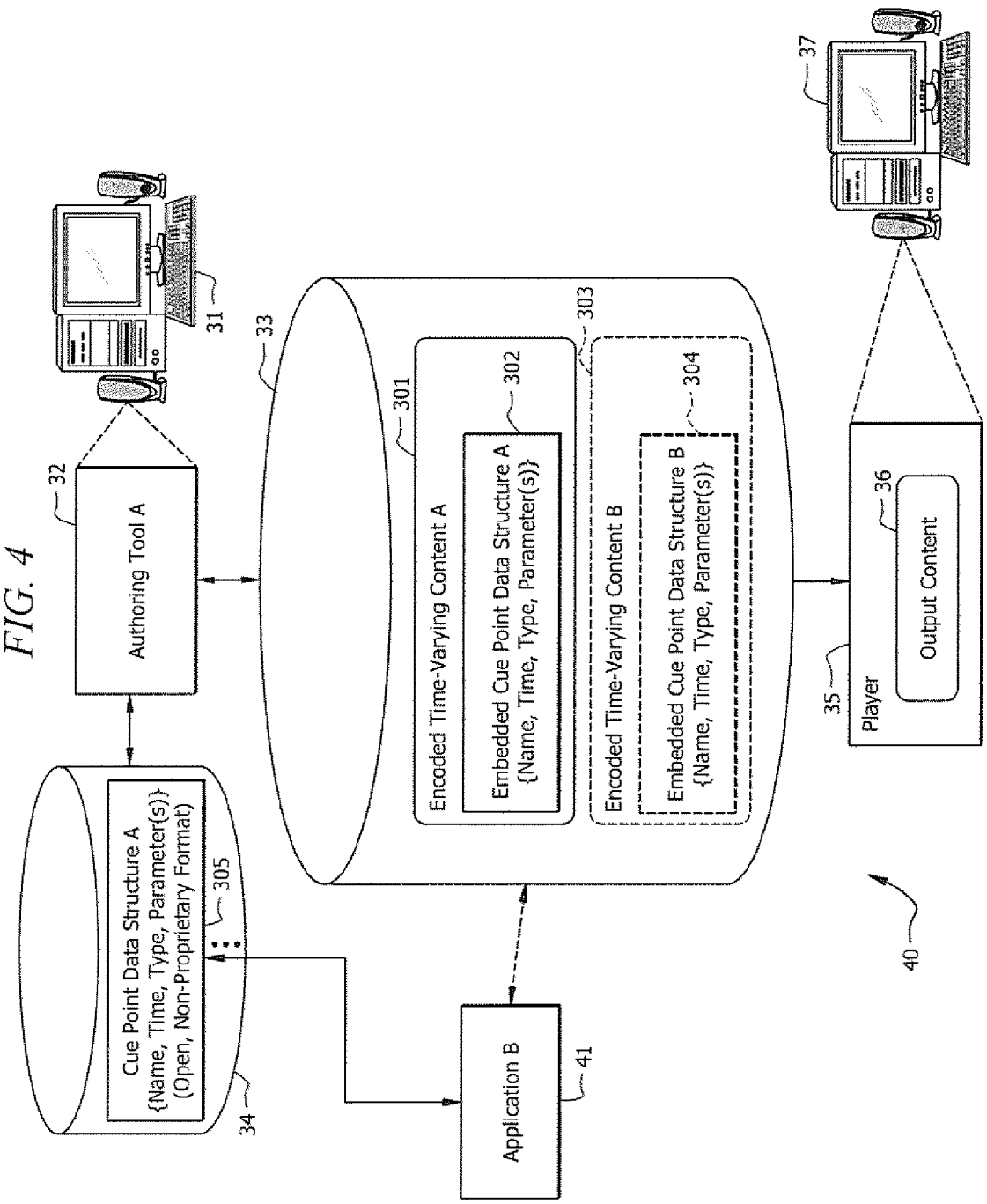
FIG. 4 shows another exemplary system, wherein a cue point data structure is stored in an open, non-proprietary format, such as XML.

For instance, FIG. 4 shows another exemplary system 40, wherein cue point data structure 305 is stored in an open, non-proprietary format, such as XML. Thus, not only is authoring tool 32 capable of reading the cue point data structure, but other authoring tools (or other types of applications) 41 (e.g., which may be executing on computer 31, computer 37, and/or some other computer to which data storage 34 is communicatively accessible) that are capable of reading the open, non-proprietary format (e.g., XML) may be used for reading, modifying, and/or otherwise employing the cue point data structure 305.

According to embodiments of the present invention, all or a portion of a cue point data structure defining cue points for a given recorded time-varying content file may be embedded within such recorded time-varying content file, with the data structure defining such cue point(s) also maintained independently accessible (e.g., cue point data structure 305 is independently accessible without accessing a given recorded time-varying content file, such as file 301). In certain embodiments, all of the cue point data structure may not be embedded into the recorded time-varying content file. Rather, in certain embodiments, only a portion of the cue point data structure is embedded (e.g., a name and corresponding time identifier), and the remaining portion of the cue point data structure (e.g., parameters) may be maintained external to the recorded time-varying content file. Thus, the embedded cue point data structure may cause the external cue point data structure to be read upon such embedded cue point structure being encountered, wherein the externally-accessed cue point data structure specifies the parameters for the action(s) that are to be triggered. In this way, the embedded cue point data structure may, in some implementations, be a mere flag that references a corresponding external cue point data structure that defines the parameters for the action(s) to be triggered.

Figure 5:
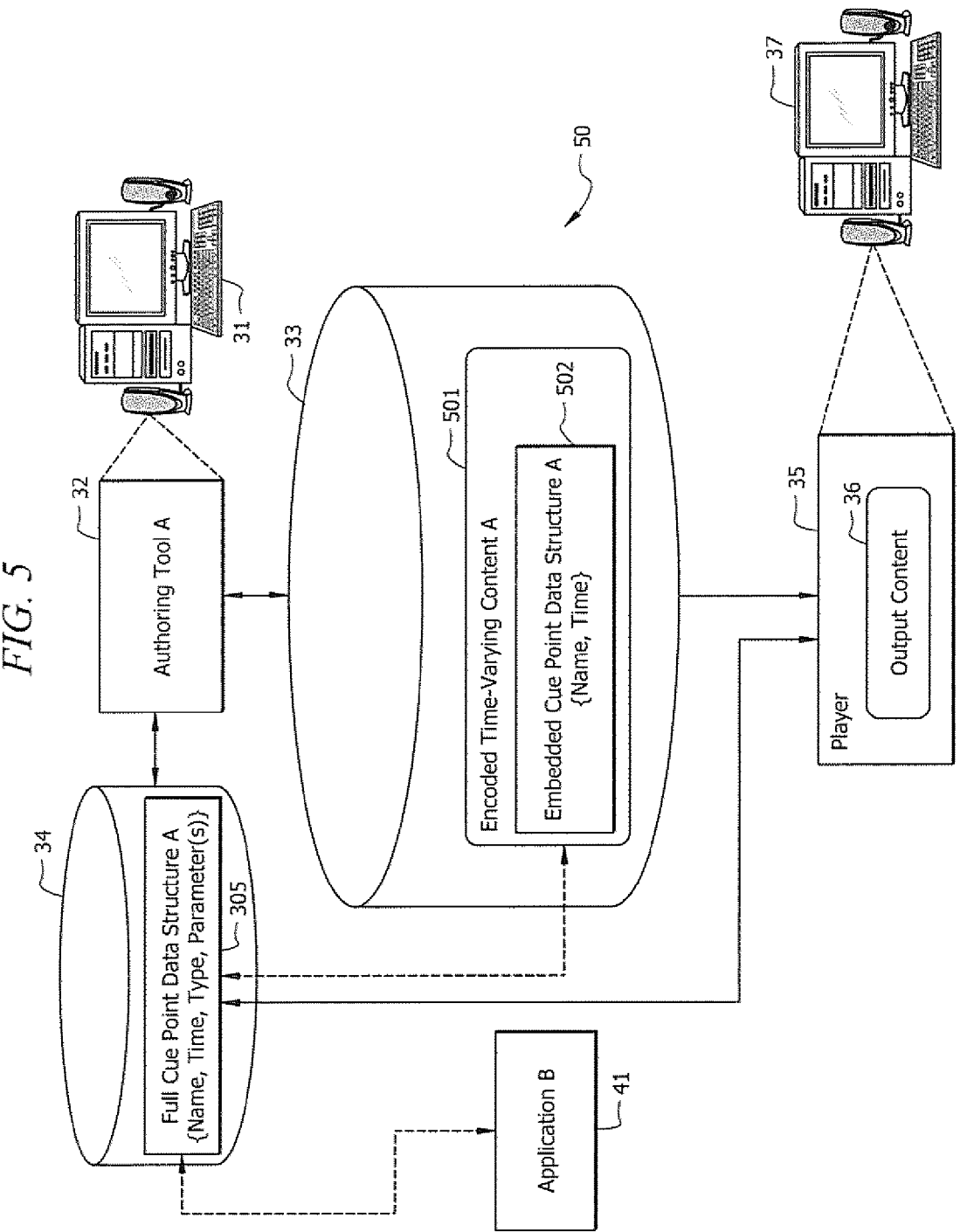
FIG. 5 shows another exemplary system in which an authoring tool embeds only a portion of a cue point data structure into a recorded time-varying content file, and an externally-accessible cue point data structure is accessed to provide the remaining portion of the cue point data.

FIG. 5 shows another exemplary system 50 in which authoring tool 32 embeds only a portion of a cue point data structure into a recorded time-varying content file, and an externally-accessible cue point data structure 305 is accessed to provide the remaining portion of the cue point data. In this example, upon an author interacting with authoring tool 32 to specify one or more cue points for recorded time-varying, content 501, the information for the cue points such as their name, time, type, and parameters is saved by the author as cue point data structure 305. A portion of that information is embedded into the encoded file 501, shown as embedded partial cue point data structure 502. For instance, the name of the cue point and the time at which such cue point occurs in the course of playback of the file 501 may be embedded in file 501. Upon the cue point 502 being encountered during playback by player 35, the player 35 may access the parameter data contained in cue point data structure 305 for such cue point 502.

This may enable the actions to be taken for a cue point to be dynamically edited (e.g., even during run-time of the playback of the recorded time-varying content file 501). For instance, suppose that the parameter information stored to data structure 305 specified a subtitle of "The End" that is to be displayed upon cue point 502 being encountered, during playback of recorded time-varying content file 501. A user may, without altering encoded time-varying content file 501 in any way, use authoring tool 32 or some other application 41 to access cue point data structure 305 and modify the parameter to change the subtitle to instead read "Goodbye". Thus, upon player 35 encountering cue point 502 during playback of file 501, it will display the new subtitle "Goodbye" as specified by the full cue point data structure 305.

Figure 6:
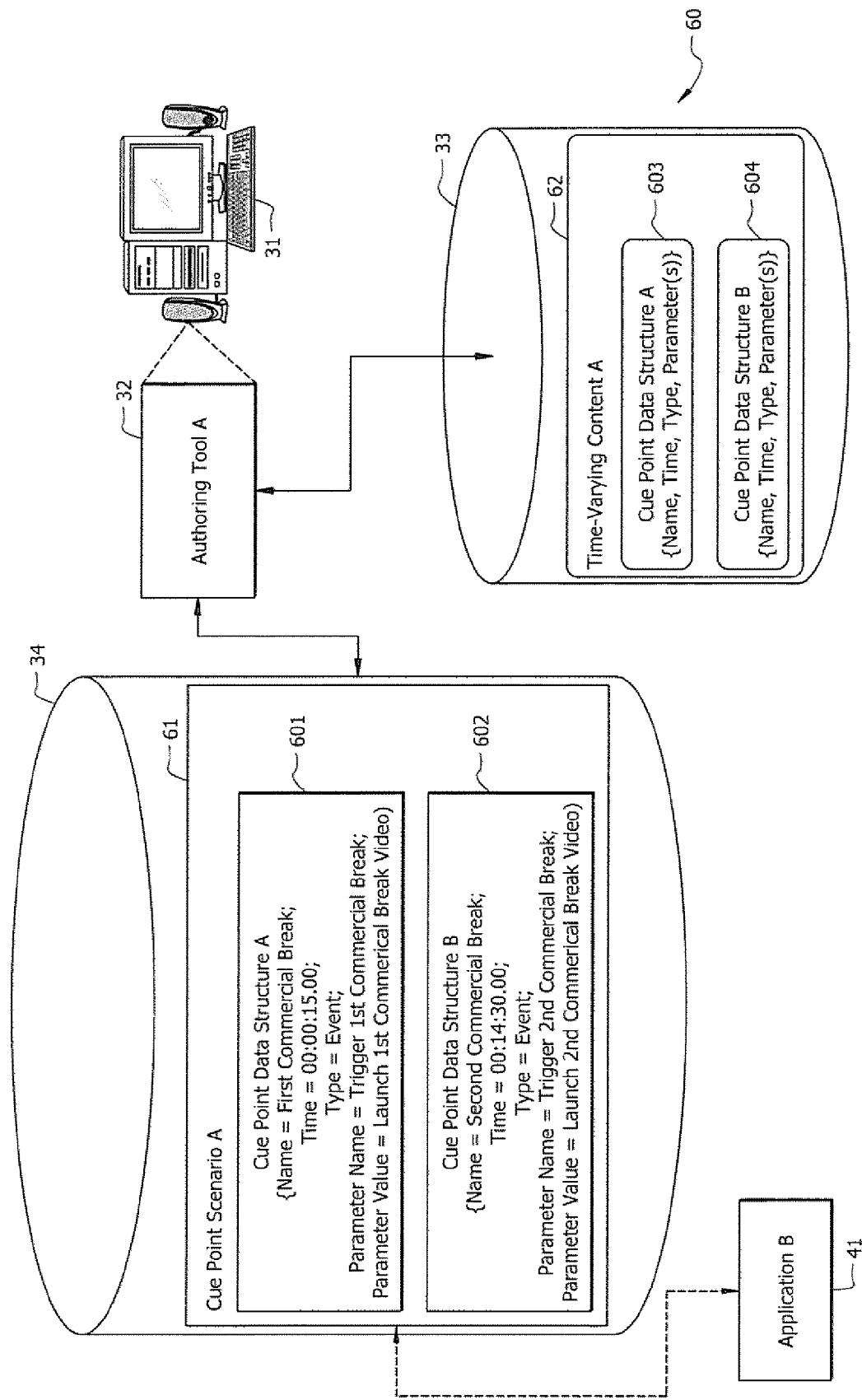
FIG. 6 shows another exemplary system wherein a plurality of cue points are saved as a cue point scenario, according to one embodiment of the present invention.

Further, in certain embodiments of the present invention, a plurality of cue points may be saved together as a cue point scenario. For instance, FIG. 6 shows another exemplary system 60 wherein a plurality of cue points 601, 602 are saved as a cue point scenario 61. As an example, an author may use authoring tool 31 to define cue points for various commercial breaks (and/or other actions) that are to occur at various points during playback of a first recorded television episode. For instance, a first cue point 601 may be defined as occurring at 15 seconds into the video (e.g., following the opening credits for the show), which is to trigger a first commercial break video (as specified by the parameters of data structure 601); and a second cue point 602 may be defined as occurring at 14 minutes, 30 seconds into the video (e.g., following the first segment of the show), which is to trigger a second commercial break video (as specified by the parameters of data structure 602).

Such defined cue points 601-602 may be saved to data storage 34 as a cue point scenario 61 (e.g., named, in this example, Cue Point Scenario A) that is independently accessible (i.e., can be recalled without reference to the first recorded television episode). Thus, when authoring a second recorded television episode, such as recorded time-varying content 62 in the illustrated example, the author may recall the saved cue point scenario 61 and apply it to the second recorded television episode 62. Such application inserts into the second recorded television episode 62 the cue points 601 and 602 for commercial breaks (and/or other actions) at the specific times as defined for the first television episode. Thus, the author can recall cue point scenario 61 and utilize it as a template to efficiently insert the cue points that are likely desired for the second recorded television episode 62 (as each television episode typically follows a pre-defined structure).

Of course, the author may further modify one or more of the inserted cue points 601-602 for the second television episode 62 (e.g., before encoding the second television episode). For instance, the specific times at which one or more of the commercial breaks is to occur for this second television episode 62 may need to be adjusted slightly, etc. For instance, it may be desired to have the second commercial break occur at 15 minutes, rather than at 14 minutes, 30 seconds. Thus, once the cue point scenario 61 is used to insert the cue points into the second television episode being authored, the author can use authoring tool 32 to edit those cue points in a traditional manner (e.g., by dragging the cue points to a desired time, etc.). In this manner, the defined cue point scenario can effectively be recalled and used as a template or starting point for authoring similarly structured recorded time-varying content files (e.g., television episodes, etc.), which greatly enhances the efficiency of the author. If the cue points are modified for the second television program, the modified cue points may be saved to data storage 34, if so desired, as a different cue point scenario. Once the cue points are arranged as desired for the second television episode 62, the video may be encoded with all or a portion of the cue point data structures embedded therein, shown as embedded cue point data structures 603 and 604 in this example.

Figure 7A:
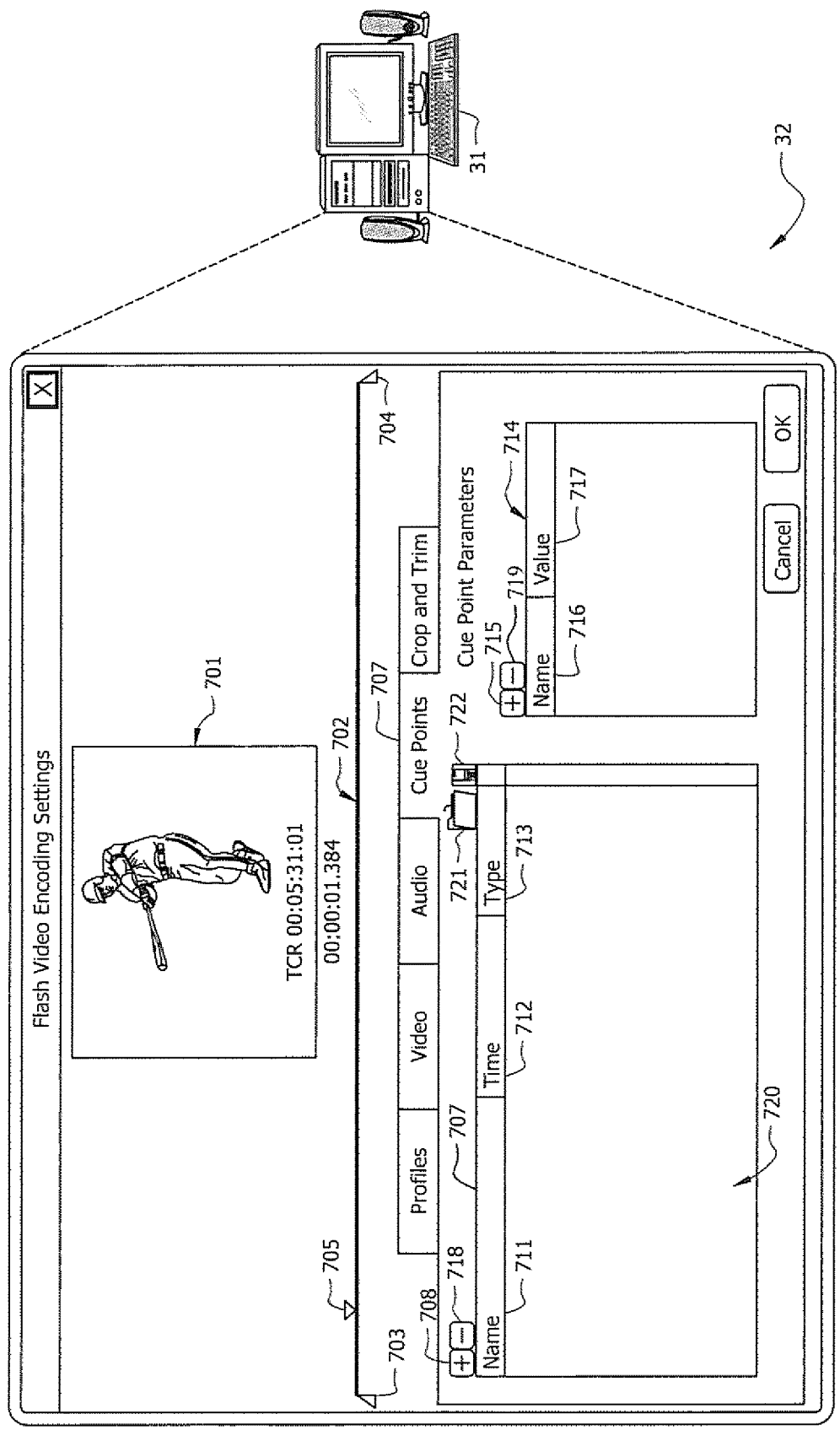

FIGS. 7A-7E show an exemplary user interface provided by authoring tool 32 according to one embodiment of the present invention, wherein the user interface is employed for inserting cue points into a video in the manner described hereafter. FIG. 7A shows an exemplary user interface that may be presented by authoring tool 32 according to one embodiment of the present invention. The exemplary user interface is similar in many regards to the user interface described in FIGS. 1A-1B above. For instance, the exemplary interface of authoring tool 32 provides a content preview display 701 which allows the author to view portions of the content. For instance, the author can "scrub" (or move) along the video's reference timeline 702 to view corresponding parts of the video content. The user may view the video frame-by-frame, in slow-motion playback, etc.

A cue point insertion interface 707 is also provided. On the reference timeline 702, a playback head indicator 705 is shown, which may be used to locate a specific frame in the video in which the author wants to embed a cue point. For greater precision, the author may select the playback head 705 and use the left and right arrow keys on a keyboard to locate specific points within the video's content. Thus, the video preview window 701 enables an author to visually identify points in the video at which to insert a cue point. The author can also use the elapsed time counter (as indicated by elapsed time indicators 703 and 704 that are located beneath the video preview window 701) to locate specific points in time at which to embed cue points.

When the playback head 705 is positioned on the desired frame, the author can activate (e.g., click with a mouse) the Add Cue Point button 708. Authoring tool 32 then embeds a cue point on that frame of the video. Responsive to the user activating the add cue point button 708, a new cue point is added in the cue point list 720. The new cue point is defined by certain data, such as a name 711, time 712, and type 713 (e.g., an event or navigation type of cue point). A selected cue point may be removed from the cue point list by activating (e.g., clicking on) Remove Cue Point button 718.

Time 712 identifies the time during playback of the video (e.g., the time on the videos reference timeline 702) when the corresponding event will be triggered by the cue point. Additionally, as discussed above, the cue point data structure typically comprises parameter data that defines an action to be triggered. Thus, for each cue point added in list 720, the author may add one or more parameters into parameter interface 714 by activating insert parameter button 715. For any such parameter, the author may define a corresponding name (in name field 716) and value (in value field 717). For instance, a parameter named "End Subtitle" may be defined whose value specifies the text "The End" to be presented at a corresponding point near the end of the video (designated by the cue point's time field 712), A selected parameter may be removed by activating (e.g., clicking on) Remove Parameter button 719.

According to embodiments of the present invention, this exemplary interface further enables a user to save cue point data structures (or cue point scenarios) and recall (e.g., open) previously-saved cue point data structures (or cue point scenarios). For instance, the exemplary interface of FIG. 7A includes an Open interface 721 that when activated (e.g., clicked on) by a user enables the user to open a previously-saved cue point data structure (or cue point scenario), and the interface includes a Save interface 722 that when activated (e.g., clicked on) by a user enables the user to save a currently-defined cue point data structure (or cue point scenario).

Figure 7B:
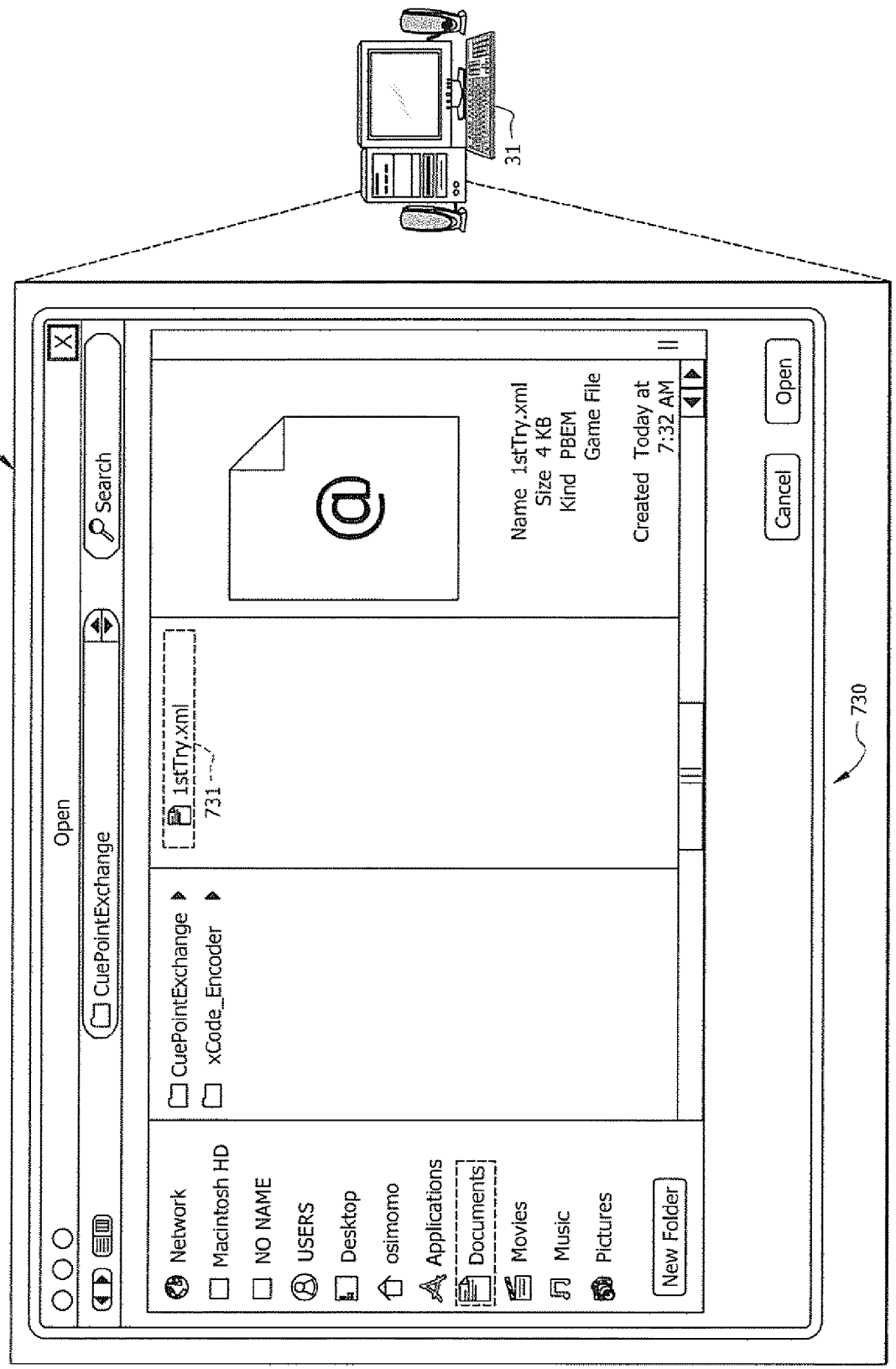
Figure 7D:
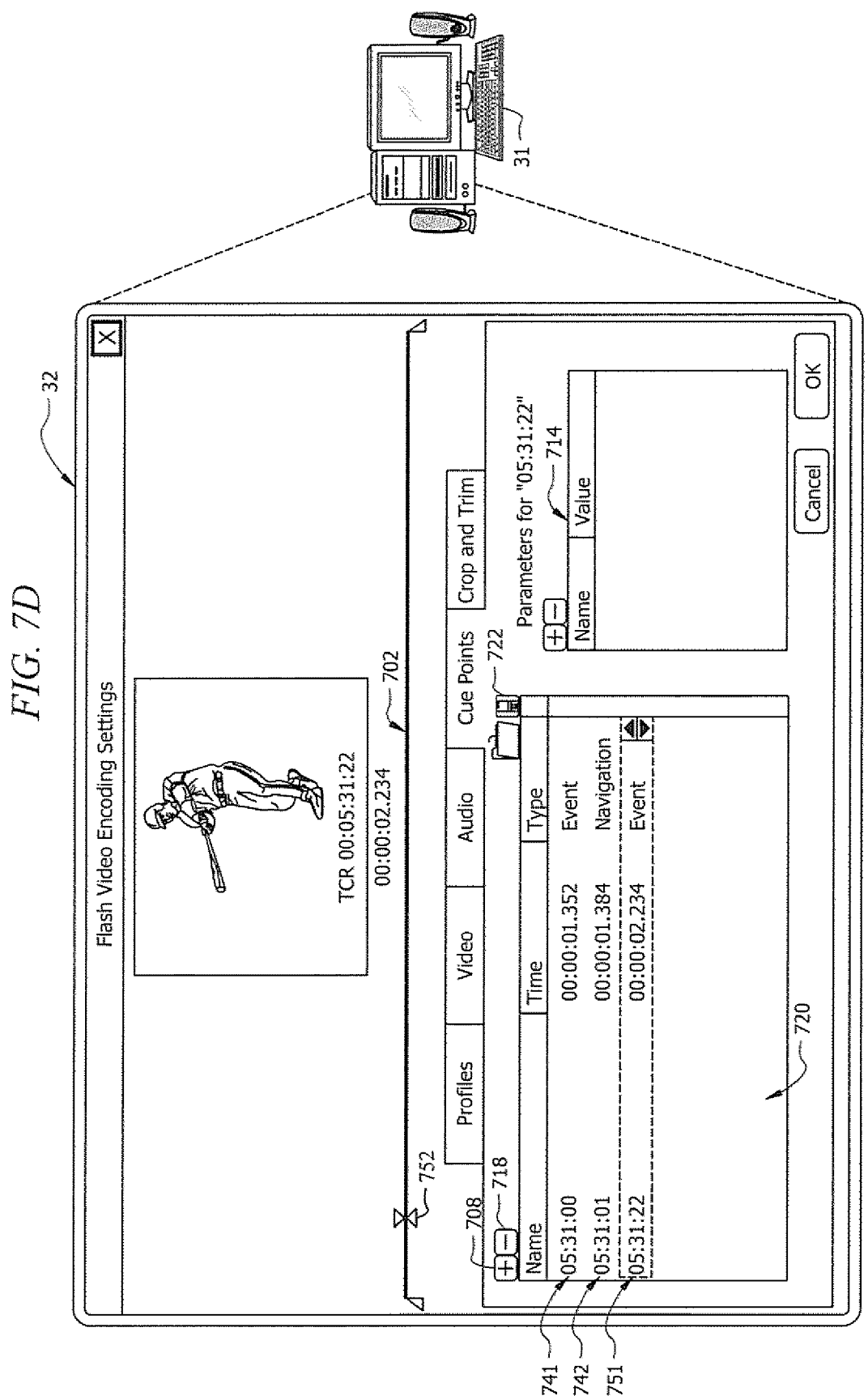

For instance, suppose that in editing a video, the user clicks Open interface 721, an interface 730 as shown in FIG. 7B may be presented to the user. Interface 730 enables the user to browse a file system directory to locate a previously-saved cue point data structure (or cue point scenario) that the user desires to open. In the illustrated example, the user locates and opens a previously-saved cue point scenario named "1stTry.xml".

In response to opening such cue point scenario "1stTry.xml", the corresponding cue points defined within such scenario are inserted into the cue point list 720. For instance, as shown in FIG. 7C, this exemplary 1stTry.xml cue point scenario inserts two cue points 741 and 742. The user may modify those individual cue points 741 and 742 in a traditional manner, such as by changing the time at which they reside in the video, changing their names, changing one or more of their parameters, etc.

In addition, the user may remove one or more of the cue points 741 and 742 and/or add new cue points. For instance, in FIG. 7D, the user clicks Add Cue Point button 708 to insert an additional cue point 751 into the video. When a given cue point is selected, such as the newly inserted cue point 751 in FIG. 7D, a corresponding cue point marker 752 may be displayed on the slider control (of reference timeline 702) at the point where the cue point resides, whereby the can use the cue point marker 752 to adjust the placement of the cue point. That is, the author may adjust the placement of the cue point within the video by dragging the corresponding cue point marker 752 to the desired point on timeline 702.

Figure 7E:
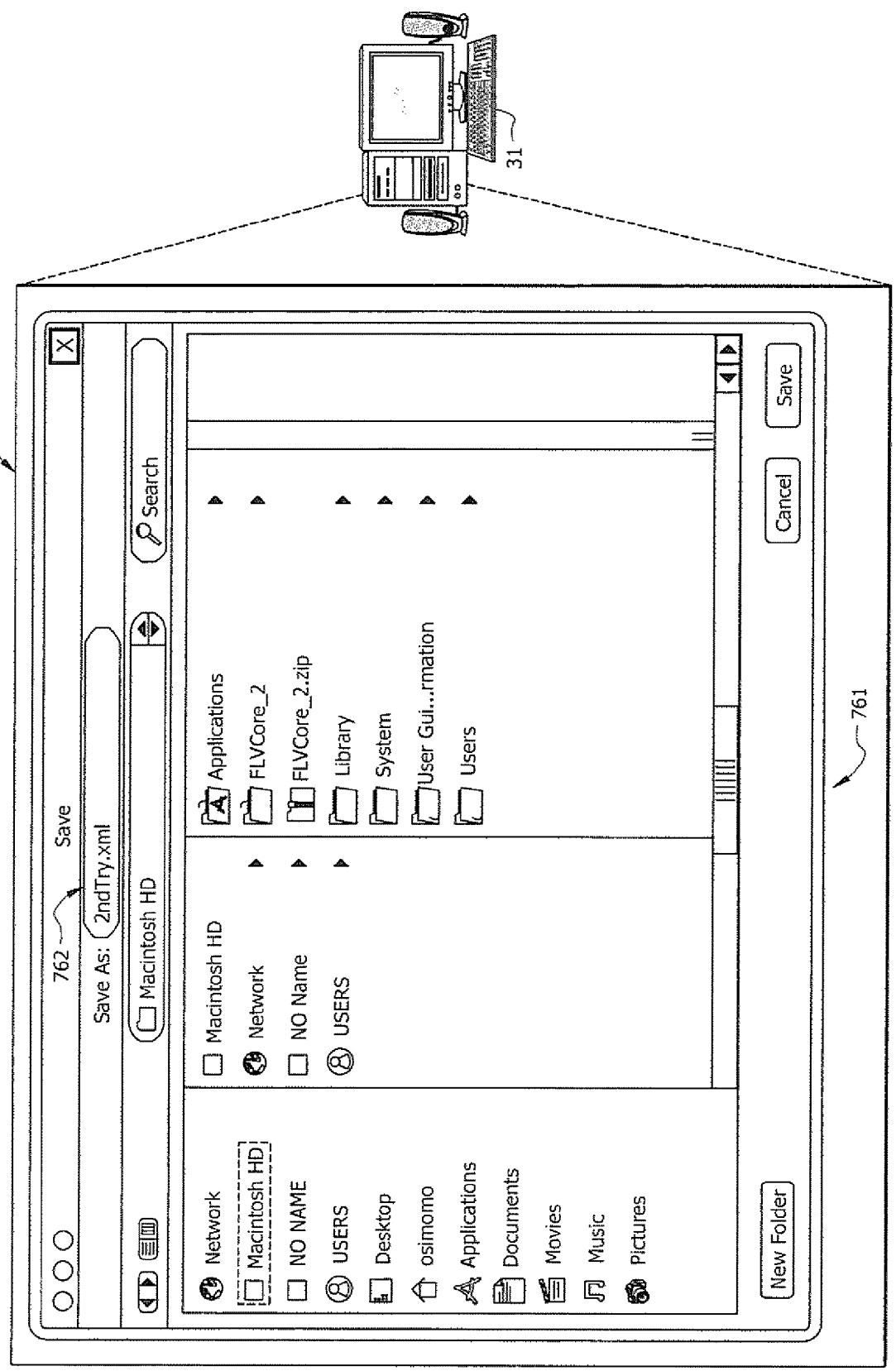

Once the new cue point scenario (containing cue points 741, 742, and 751) is created as desired by the user, the user may save this new cue point scenario such that it is accessible independent of the video currently being edited (i.e., such that the new cue point scenario may be reused for application to other videos in a manner similar to how the user utilized the cue point scenario 1stTry.xml in this instance). Accordingly, the user may activate the Save interface 722, and in response an interface 761 as shown in FIG. 7E may be presented to the user. Interface 761 enables the user to store the cue point data structure (or cue point scenario) to a file system directory in a manner commonly used for saving files. In the illustrated example, the user saves the new cue point scenario to a desired location as a cue point scenario named "2ndTry.xml".

As mentioned above, according to one embodiment, the cue point data structure is stored as in an XML format. According to one embodiment, the XML format used for Cue-Point exchange is defined according to the following DTD:

```
<!DOCTYPE FLVCoreCuePoints [
    <!ELEMENT FLVCoreCuePoints (CuePoint+)>
        <! - -FLVCoreCuePoints is the root element in the XML file and must
contain at least one CuePoint element
        <!ELEMENT CuePoint     (Time, Type, Name, Parameters?)>
            <! - - CuePoint contains the data for a particular cue point, and must
contain one each of Time, Type, and Name elements, and may contain one Parameters
element -->
            <!--.ELEMENT Time      (#CDATA)>
                <!-- Time contains the cue point time as an integer in milliseconds- - >
            <!ELEMENT Type    (#CDATA)>
                <!- Type contains the cue point type as a case-sensitive string, either
"event" or "navigation" - - >
            <!ELEMENT Name    (#CDATA)>
                <! - - Name contains the cue point name as a text string; it also can contain
a parameter name when appearing inside a Parameter element - ->
            <!ELEMENT Parameters    (Parameter+)>
                <! - - Parameters contains the cue point's parameters. It must contain at
least one Parameter element - - >
                <!ELEMENT Parameter   (Name, Value)>
                    <! -- Parameter contains the data for one of a cue point's parameters. It
must contain one each of Name and Value elements - - >
                <!ELEMENT Value   (#CDATA)>
                    <!- - Value contains the value-part of the name-value pair for a cue point
parameter - ->
        ] >
```

Beyond the formal restrictions placed by the DTD, the following characteristics apply to the XML format according to one embodiment:

All comments as to the particulars of the data inside the tags in the DTD above will be enforced on read; non-compliant XML will result in an error.

Cue points appear in ascending time order in the XML file and there is only one at a particular time.

The XML format is written out as UTF-8. Other encodings will be supported if they are properly declared via an XML declaration with encoding (e.g. <?xml version="1.0" encoding="UTF-16"?> or a BOM marker in the file.

An example XML file, according to one embodiment of the present invention, is reproduced below:

```
<?xml version="1.0" encoding="UTF-8"?>
<FLVCoreCuePoints>
    <CuePoint>
        <Time>2000</Time>
        <Type>navigation</Type>
        <Name>SeekPoint</Name>
        <Parameters>
            <Parameter>
                <Name>SeekPointName</Name>
                <Value>The Swordfight</Value>
            </Parameter>
            <Parameter>
                <Name>Characters</Name>
                <Value>Inigo Montoya., The Dread
                Pirate Roberts</Value>
            </Parameter>
        </Parameters>
    </CuePoint>
    <CuePoint>
        <Time>3540</Time>
        <Type>event</Type>
        <Name>Caption</Name>
        <Parameters>
            <Parameter>
                <Name>CaptionText</Name>
                <Value>You seem a decent fellow.
                I hate to kill you.</Value>
            </Parameter>
            <Parameter>
                <Name>Speaker</Name>
                <Value>Inigo Montoya</Value>
            </Parameter>
            <Parameter>
                <Name>SpeakerShortName</Name>
                <Value>Inigo</Value>
            </Parameter>
        </Parameters>
    </CuePoint>
    <CuePoint>
        <Time>6250</Time>
        <Type>event</Type>
        <Name>Caption</Name>
        <Parameters>
            <Parameter>
                <Name>CaptionText</Name>
                <Value>You seem a decent fellow.
                I hate to die.</Value>
            </Parameter>
            <Parameter>
                <Name>Speaker</Name>
                <Value>The Dread Pirate Roberts</Value>
            </Parameter>
            <Parameter>
                <Name>SpeakerShortName</Name>
                <Value>Roberts</Value>
            </Parameter>
        </Parameters>
    </CuePoint>
</FLVCoreCuePoints>
```

Figure 8:
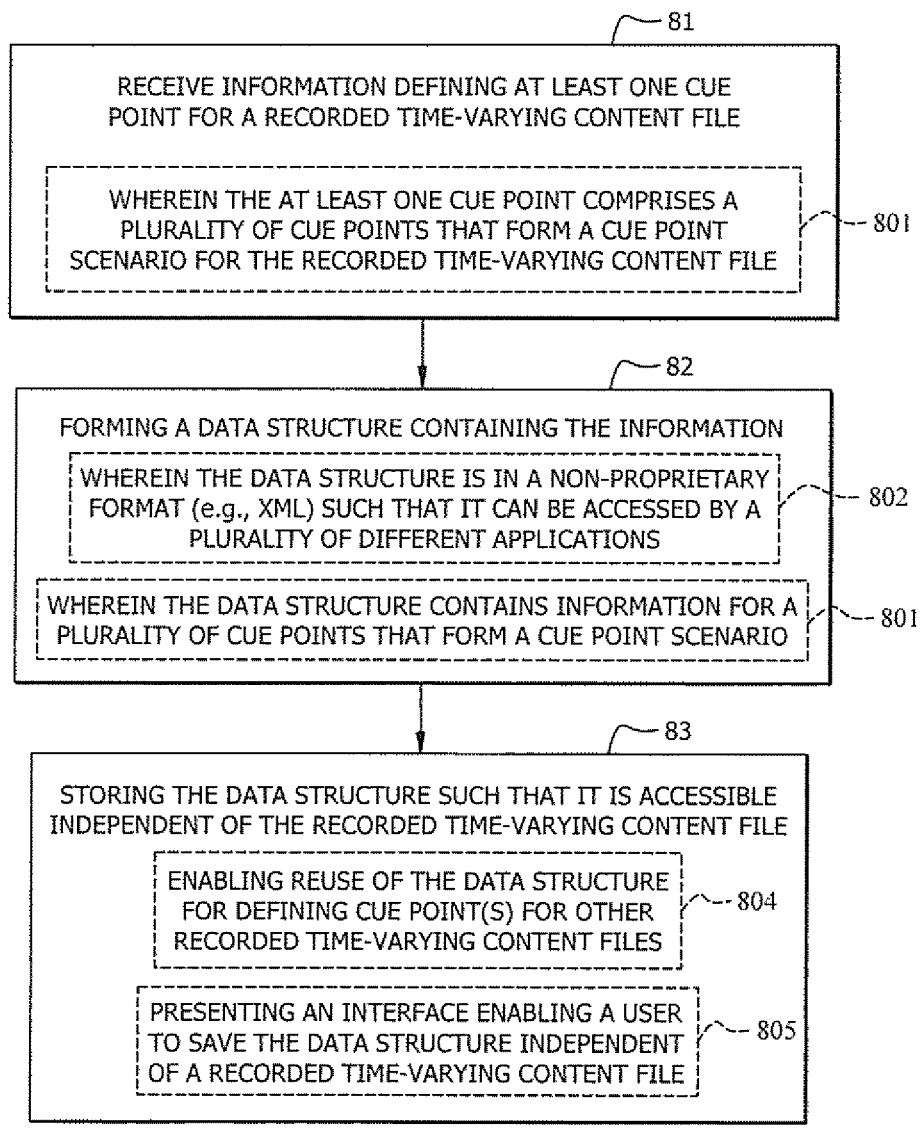
FIG. 8 shows an exemplary operational flow diagram for one embodiment of the present invention.

Turning now to FIG. 8, an exemplary operational flow according to one embodiment of the present invention is shown. In this example, an authoring tool 32 receives, in operational block 81, Information defining at least one cue point for a recorded time-varying content file. As shown in optional block 801, the at least one cue point may comprise a plurality of cue points that form a cue point scenario for the recorded time-varying content file, such as cue points 741, 742, and 751 in the example of FIG. 7D. The information received in block 81 may comprise various information defining the cue point(s), such as a name for the cue point, a corresponding time in the recorded time-varying content at which the cue point resides, a type of the cue point (e.g., event, navigation, etc.), as well as parameters defined for the cue point.

In operational block 82, the authoring tool 32 forms a data structure containing the received information. The data structure is stored (e.g., to data storage 34 of FIGS. 3-6) such that it is accessible independent of the recorded time-varying content file. In this way, the data structure is reusable for a plurality of different recorded time-varying content files. In certain embodiments, as shown in optional block 802, the data structure may be formed in an open, non-proprietary format (e.g., XML) such that it can be accessed by a plurality of different applications. Also, as shown in optional block 803, in some instances a plurality of cue points may form a cue point scenario for a recorded time-varying content file, wherein the stored data structure may contain information for the plurality of cue points that form such a scenario, such as scenario 61 of FIG. 6.

In operational block 83, the data structure is stored (e.g., to data storage 34) such that it is accessible independent of the recorded time-varying content file. Thus, as shown in optional block 804, this enables reuse of the data structure for defining cue point(s) for other recorded time-varying content files. In certain embodiments, as shown in optional block 805, the authoring tool presents an interface enabling a user to save the data structure (e.g., Save interface 722 of FIG. 7A) independent of a recorded time-varying content file.

When implemented via computer-executable instructions, various elements of embodiments of the present invention are in essence the software code defining the operations of such various elements. The executable instructions or software code may be obtained from a readable medium (e.g., a hard drive media, optical media, EPROM, EEPROM, tape media, cartridge media, flash memory, ROM, memory stick, and/or the like).

Figure 9:
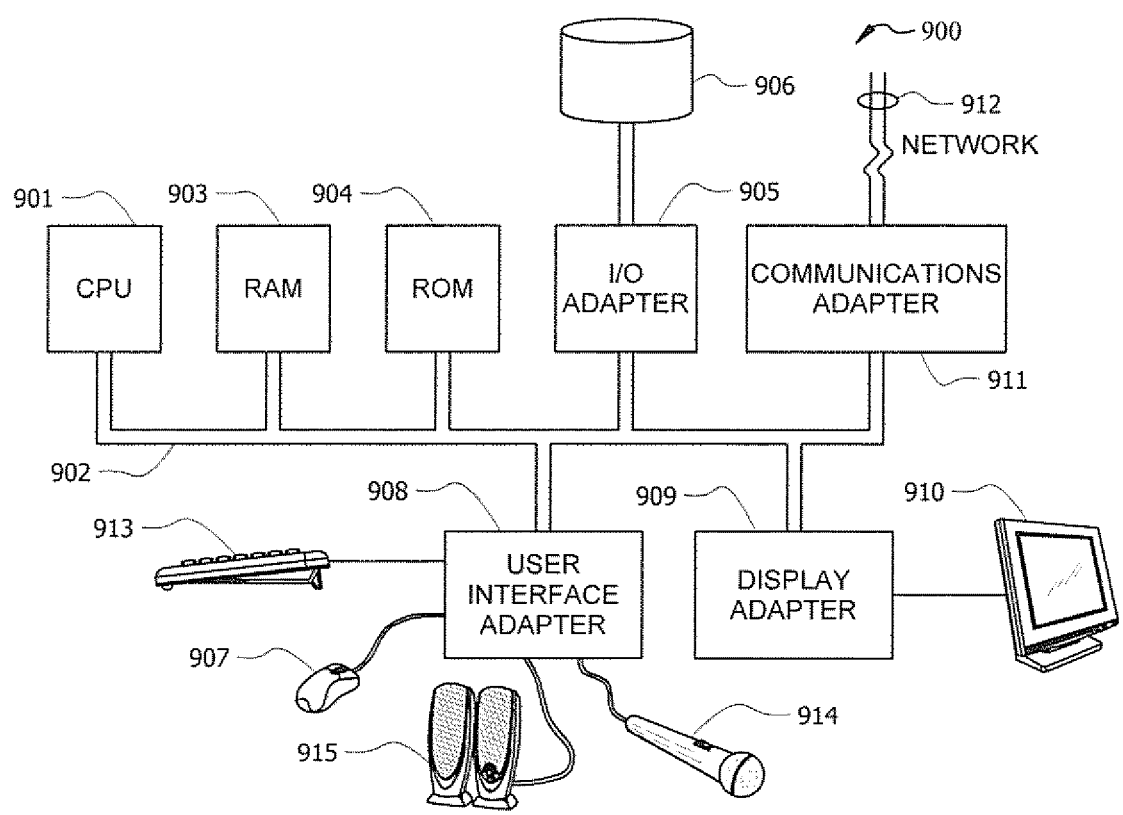
FIG. 9 shows an exemplary system on which an authoring tool may be implemented according to one embodiment of the present invention.

FIG. 9 illustrates an exemplary computer system 900 on which authoring tool 32 may be implemented according to one embodiment of the present invention. Central processing unit (CPU) 901 is coupled to system bus 902. CPU 901 may be any general-purpose CPU. The present invention is not restricted by the architecture of CPU 901 (or other components of exemplary system 900) as long as CPU 901 (and other components of system 900) supports the inventive operations as described herein. CPU 901 may execute the various logical instructions according to embodiments of the present invention. For example, CPU 901 may execute machine-level instructions according to the exemplary operational flow described above in conjunction with FIG. 8.

Computer system 900 also preferably includes random access memory (RAM) 903, which may be SRAM, DRAM, SDRAM, or the like. Computer system 900 preferably includes read-only memory (ROM) 904 which may be PROM, EPROM, EEPROM, or the like. RAM 903 and ROM 904 hold user and system data and programs, as is well known in the art.

Computer system 900 also preferably includes input/output (I/O) adapter 905, communications adapter 911, user interface adapter 908, and display adapter 909. I/O adapter 905, user interface adapter 908, and/or communications adapter 911 may, in certain embodiments, enable a user to interact with computer system 900 in order to input information, such as interacting with a user interface to define cue points for a recorded time-varying content file, as described above.

I/O adapter 905 preferably connects to storage device(s) 906, such as one or more of hard drive, compact disc (CD) drive, floppy disk drive, tape drive, etc. to computer system 900. The storage devices may be utilized when RAM 903 is insufficient for the memory requirements associated with storing data for operations of the authoring tool 32. Communications adapter 911 is preferably adapted to couple computer system 900 to network 912, which, may enable information to be input to and/or output from system 900 via such network 912 (e.g., the Internet or other wide-area network, a local-area network, a public or private switched telephony network, a wireless network, any combination of the foregoing). User interface adapter 908 couples user input devices, such as keyboard 913, pointing device. 907, and microphone 914 and/or output devices, such as speaker(s) 915 to computer system 900. Display adapter 909 is driven by CPU 901 to control the display on display device 910 to, for example, display an interface such as the exemplary interface described above with FIGS. 7A-7E, according to certain embodiments of the present invention.

It shall be appreciated that the present invention is not limited to the architecture of system 900. For example, any suitable processor-based device may be utilized for implementing authoring tool 32, including without limitation personal computers, laptop computers, computer workstations, and multi-processor servers. Moreover, embodiments of the present invention may be implemented on application specific integrated circuits (ASICs) or very large scale integrated (VLSI) circuits. In fact, persons of ordinary skill in the art may utilize any number of suitable structures capable of executing logical operations according to the embodiments of the present invention.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
receiving, by a processor, information defining at least one cue point for a recorded time-varying content file;
forming, by the processor, a data structure containing the received information;
storing, by the processor, the data structure to data storage such that the data structure is accessible independent of the recorded time-varying content file; and
using the data structure for inserting the at least one cue point into a second recorded time-varying content file.

2. The method of claim 1 wherein the recorded time-varying content file comprises at least one of audio, video, audiovisual, animation, and multimedia content types.

3. The method of claim 1 wherein said receiving, forming, and storing are performed by an authoring tool.

4. The method of claim 1 wherein the at least one cue point comprises a plurality of cue points that form a cue point scenario for the recorded time-varying content file.

5. The method of claim 4 wherein said storing comprises:
storing the cue point scenario to said data storage such that the cue point scenario is accessible independent of the recorded time-varying content file.

6. The method of claim 1 wherein said receiving comprises:
receiving one or more of a name for the at least one cue point, a corresponding time in the recorded time-varying content at which the at least one cue point resides, a type of the at least one cue point, and one or more parameters for the at least one cue point.

7. The method of claim 1 further comprising:
reusing the data structure for inserting said at least one cue point into at least a second recorded time-varying content file.

8. The method of claim 1 wherein the data structure is stored in a non-proprietary format comprising extensible mark-up language (XML) format.

9. The method set forth in claim 1, wherein the data structure is a cue point exchange data structure comprising a plurality of cue point elements, each cue point element comprising a time element and at least one parameter element.

10. A method of claim 1 further comprising embedding, by the processor, a cue point flag in the recorded time-varying content file, wherein the cue point flag references the data structure.

11. The method of claim 10 wherein a cue point name and corresponding time identifier are embedded as the cue point flag in the recorded time-varying content file.

12. The method of claim 1 where in the data structure comprises a cue point parameter for an action triggered by the cue point.

13. A non-transitory computer readable storage medium comprising computer-executable software code, which when executed by a computer provides an authoring tool with which a user can interact to author a recorded time-varying content file, and when executed by the computer the software code causes the computer to perform a method comprising:
receiving information defining at least one cue point for a recorded time-varying content file;
forming an extensible mark-up language (XML) formatted data structure containing the received information;
storing the data structure to data storage such that the data structure is accessible independent of the recorded time-varying content file; and
using the data structure for inserting the at least one cue point into a second recorded time-varying content file.

14. The non-transitory computer readable storage medium of claim 13 wherein the recorded time-varying content file comprises at least one of audio, video, audiovisual, animation, and multimedia content types.

15. The non-transitory computer readable storage medium of claim 13 wherein the at least one cue point comprises a plurality of cue points that form a cue point scenario for the recorded time-varying content file.

16. The non-transitory computer readable storage medium of claim 15 wherein said storing comprises:

storing the cue point scenario to said data storage such that the cue point scenario is accessible independent of the recorded time-varying content file.

17. The non-transitory computer readable storage medium of claim 13 wherein said receiving comprises:
receiving one or more of a name for the at least one cue point, a corresponding time in the recorded time-varying content at which the at least one cue point resides, a type of the at least one cue point, and one or more parameters for the at least one cue point.

18. The non-transitory computer readable storage medium of claim 13 wherein when executed by the computer the software code causes the computer to further perform:
presenting a user interface for triggering said storing of the data structure.

19. The non-transitory computer readable storage medium of claim 13 wherein when executed by the computer the software code causes the computer to further perform:
presenting a user interface for opening a previously-stored data structure that contains information defining at least one cue point.

20. The non-transitory computer readable storage medium of claim 13 wherein when executed by the computer the software code causes the computer to further perform:
enabling reuse of the data structure for inserting said at least one cue point into at least a second recorded time-varying content file.

21. The code set forth in claim 13, wherein the data structure is a cue point exchange data structure comprising a plurality of cue point elements, each cue point element comprising a time element and at least one parameter element.

22. A method comprising:
receiving, by an authoring tool, information defining a cue point scenario that contains a plurality of cue points for a recorded time-varying content file;
forming a data structure containing the received information, the data structure formed in a non-proprietary data format; and
storing the data structure to data storage such that the data structure is accessible independent of the recorded time-varying content file; and
using the data structure for inserting said plurality of cue points into a second recorded time-varying content file.

23. The method of claim 22 wherein the non-proprietary format comprises extensible mark-up language (XML) format.

24. The method of claim 22 wherein the recorded time-varying content file comprises at least one of audio, video, audiovisual, animation, and multimedia content types.

25. The method of claim 22 wherein said receiving, forming, and storing are performed by an authoring tool.

26. The method of claim 22 further comprising:
reusing the data structure for inserting said plurality of cue points into at least a second recorded time-varying content file.

27. The method set forth in claim 22,
wherein the data structure is a cue point exchange data structure comprising a plurality of cue point elements, each cue point element corresponding to a respective one of the plurality of cue points of the cue point scenario, and
wherein each cue point element of the cue point exchange data structure comprises a time element and at least one parameter element.

28. A system comprising:
a computer-readable medium to which instructions are stored;
a processor operable to execute said instructions that when executed by the processor causes the processor to:
receive information defining at least one cue point for a recorded time-varying content file,
form a data structure containing the received information,
store the data structure to data storage such that the data structure is accessible independent of the recorded time-varying content file, the data structure stored in a non-proprietary format; and
use the data structure for inserting the at least one cue point into a second recorded time-varying content file.

29. The system of claim 28 wherein the non-proprietary format comprises extensible mark-up language (XML) format.

30. The system of claim 28 wherein the recorded time-varying content file comprises at least one of audio, video, audiovisual, animation, and multimedia content types.

31. The system of claim 28 wherein the at least one cue point comprises a plurality of cue points that form a cue point scenario for the recorded time-varying content file.

32. The system set forth in claim 28, wherein the data structure is a cue point exchange data structure comprising a plurality of cue point elements, each cue point element comprising a time element and at least one parameter element.

* * * * *